Jan. 15, 1957  E. W. GOLDBERG  2,777,357
CASE AND BASE STRUCTURE COMBINATION FOR PICTURE PROJECTORS
Filed Nov. 7, 1949  3 Sheets-Sheet 1
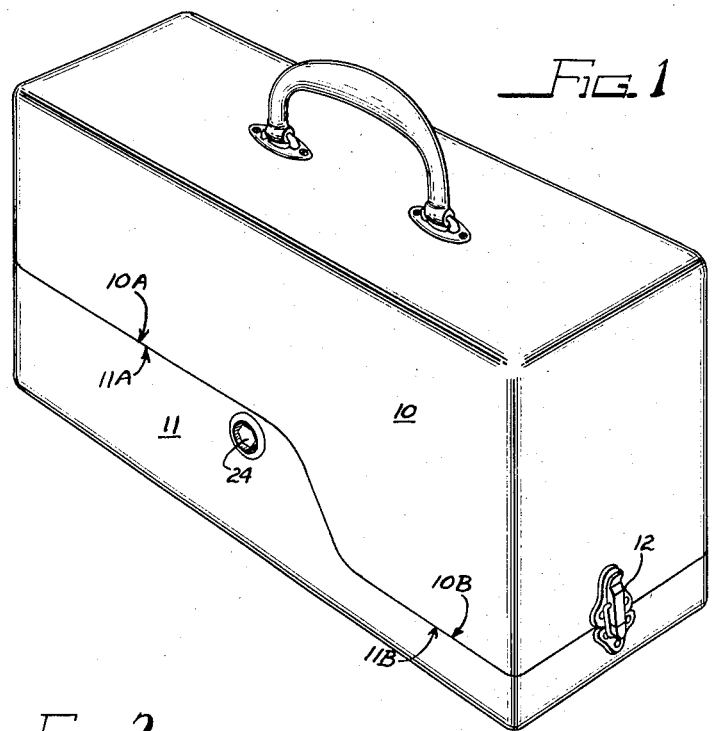
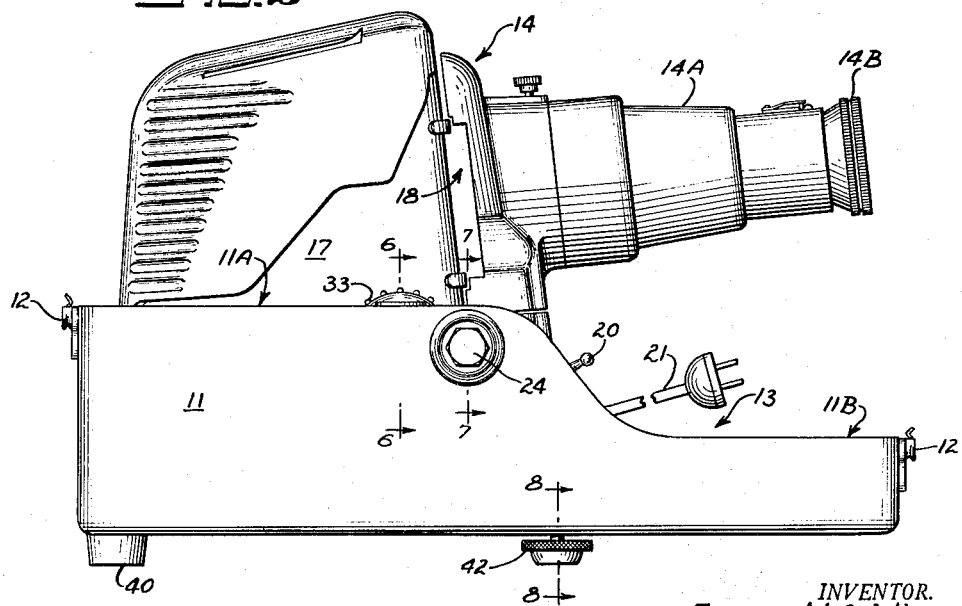
INVENTOR.
Ernest W. Goldberg
BY INVENTOR.
Ernest W. Goldberg Jan. 15, 1957      E. W. GOLDBERG      2,777,357
CASE AND BASE STRUCTURE COMBINATION FOR PICTURE PROJECTORS
Filed Nov. 7, 1949      3 Sheets-Sheet 3
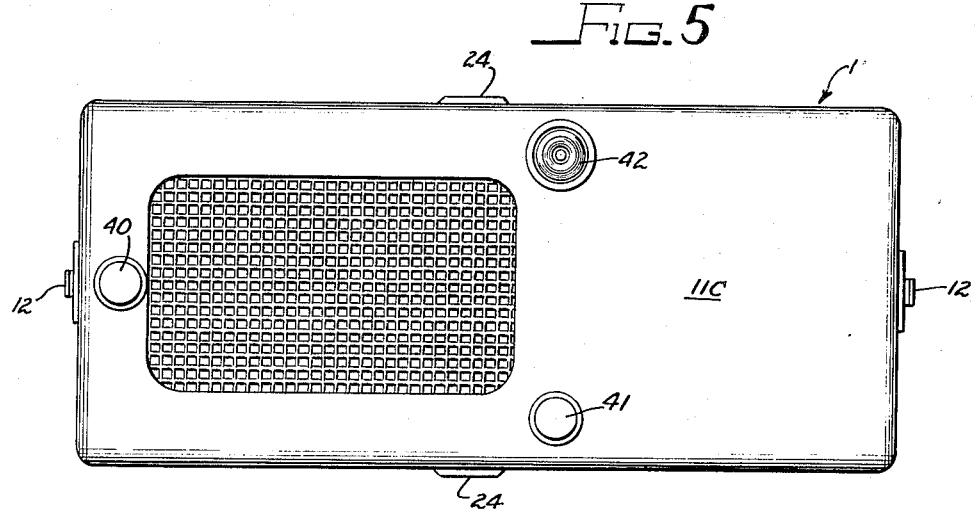
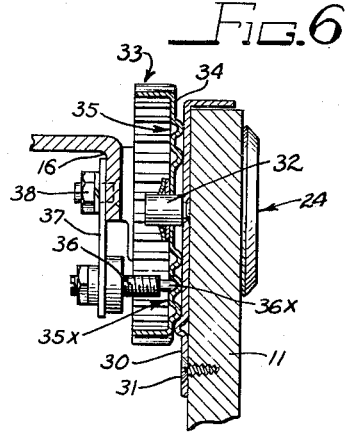
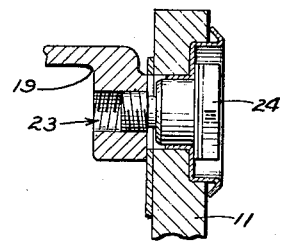
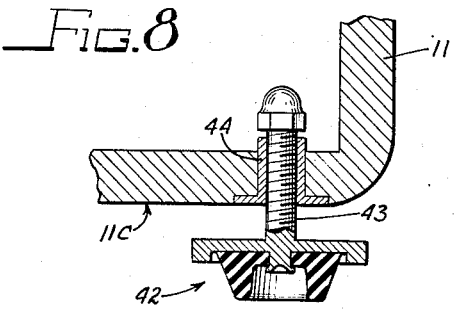
INVENTOR.
Ernest W. Goldberg

United States Patent Office 2,777,357
Patented Jan. 15, 1957

2,777,357
CASE AND BASE STRUCTURE COMBINATION FOR PICTURE PROJECTORS

Ernest W. Goldberg, Wilmette, Ill.

Application November 7, 1949, Serial No. 125,919

12 Claims. (Cl. 88—24)

This invention has as its principal object the provision of an improved carrying case and table mount for slide projectors and the like, and particularly characterized by the fact that a bottom section of the carrying case also constitutes a mounting base for the projector when the cover section is removed.

Viewed from another aspect, the invention provides a rotilt mounting for a projector, in which there is a base member in the form of a substantially rectangular tray having one end region cut away to a point approximately midway between the said end region and opposite end of the tray to afford access to certain base portions of the projector for operating switches or like mechanisms thereon and also to afford a range of movement to the projector lens barrel, the projector being trunnioned between opposite wall portions of said tray in particulars to be pointed out hereinafter, there being a rotary tilting mechanism for effecting the desired tilt adjustments in aligning the projector with the projection screen.

A further object is the provision of a rotilt projector mounting in which the pivotal axis of the trunnion mount for the projector is critically situated with respect to the center of balance of the projector unit and a rotatable tilting control acting close to the tilting axis of the projector, the slide carrier, and a special arrangement of mounting feet on the tray or rotilt mount.

Another object is the provision of a rotilt mount for a projector of the class described and characterized by a dual action in which the projector may be slowly tilted by an adjustment knob from a normalized position, and may also be rocked by a single movement from tilted to normal position by manual pressure applied to the projector housing.

A further object is the provision of a combination tilt and leveling base for a projector in which the projector unit is mounted by a rotilt trunnion means as hereinabove characterized and with tripodal feet on the bottom of the base tray, and so arranged that two of the feet underlie the projector at a point close to the trunnion axis and the slide carrier, with one of said two feet threadably adjustable relative to the bottom of the tray for shifting the elevation thereof along one side for leveling purposes, the third one of the tripodal feet being situated at the rear of the tray base beneath the lamp housing, by reason of which an extremely stable but adjustable footing is afforded for the entire base assembly, but requiring a minimum of table top area which is less than the over-all area of the projector base or tray.

A further object is the provision of a tilting mechanism for a device of the class described and including a rotary member having a concentric spiral ridge with a rotund surface and a follower pin mounted on the tiltable object eccentrically of its tilted axis to travel in said groove, and means mounting the rotary spiral member to yield in an axial direction responsive to a tilting force applied to the tiltable object so as to cause the follower pin to ride over the rotund ridges and jump the spiral grooving for the purpose of quickly tilting said object without regard to the rotary tilting means, for example where it is desired to restore the object instantly from a tilting to a normal condition.

Additional objects and aspects of utility and novelty in the disclosure pertain to details of construction and operation of the embodiment illustrated hereinafter in view of the annexed drawings, in which:

Fig. 1 is a perspective of a projector case in accordance with the invention;

Fig. 2 is a side elevation of the case with the cover removed disclosing the base tray;

Fig. 5 is a bottom plan view of the device of Figs. 1 and 2;

Fig. 6 is a magnified fragmentary section of part of the rotilt mechanism looking in the direction of lines 6—6 of Fig. 2;

Fig. 7 is a magnified sectional detail of the rotilt structure looking in the direction of lines 7—7 of Fig. 2;

Fig. 8 is a magnified sectional detail of the elevating leg structure for the base looking in the direction of lines 8—8 of Fig. 2;

The complete carrying case as shown in Fig. 1 is of generally elongated, rectangular configuration, and consists of a top section 10 and a bottom tray section 11 with suitable catch means 12 at the front and rear ends of said members for securing the same in assembled relation.

As in Fig. 2, the base portion 11 is of an especial configuration in that one end region is cut away as at 13 between the forward end wall and a point approximately midway toward the opposite end wall and adjacent a rocking axis for the projector to be described hereinafter, so that the base resembles somewhat the shape of a shoe, and constitutes a tray into which the projector fits for pivotal mounting in the particulars hereinafter specified.

The lower margins 10A and 10B of the cover section are curved in complementary sense to interfit with the meeting edges 11A and 11B of the base tray, to define the complete carrying case shown in Fig. 1.

Figure 4:
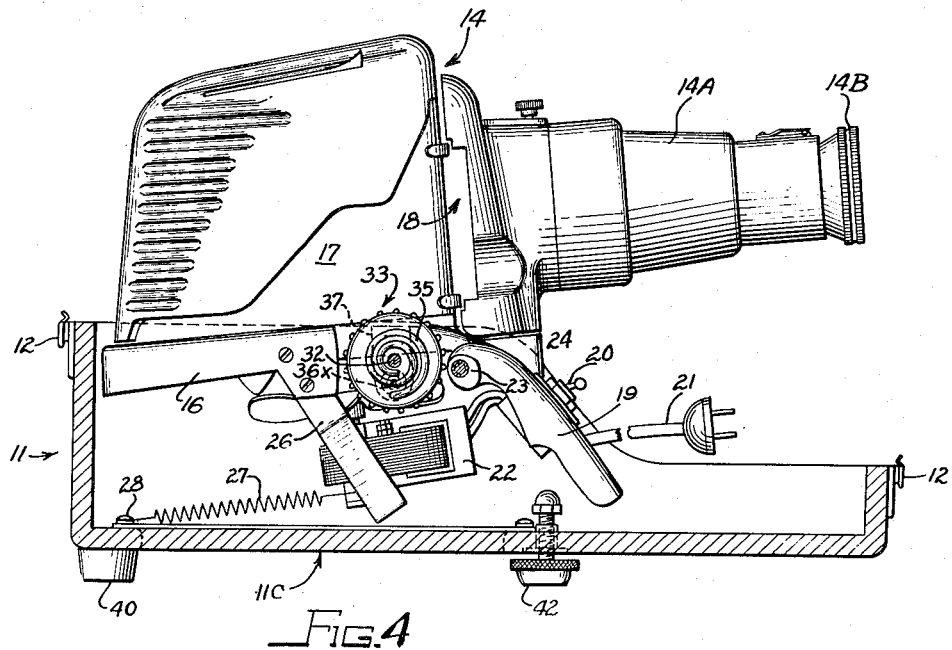
Fig. 4 is a longitudinal section through the base tray showing parts in elevation and looking in the direction of lines 4—4 of Fig. 3.

The projector, as shown in Fig. 4, has an especial base structure including a bottom flange 16 in the regions beneath the lamp housing 17; and near its forward regions beneath the slide carrier slot 18 is an integral downwardly curved apron 19 on which is mounted the power control switch 20, and through a suitable opening in which is led the conductor cord 21. A connecting block (not seen) is also mounted on the under side of the apron 19 between the switch 20 and the cord 21 for effecting necessary cross connections to the electrical instrumentalities, such as the blower motor 22 (Fig. 4) and the projecting lamp (not seen) in housing 17.

At the inner and upper terminus of the apron 19 are tapped bores 23 (Figs. 4 and 7) into which are threaded trunnion bolts 24 extended through the opposite side walls of the tray section 11, and providing the pivotal axis for the projector unit in the base or tray section.

Depending from the base flange is a motor mounting bracket 26 (Fig. 4) to which is attached one end of a counterbalancing spring 27, anchored to the base as at 28, for the purpose of balancing the weight of the lamp housing section 17, which would otherwise leave the entire weight of the housing on the eccentrically located follower pin in the rotilt adjusting wheel.

Figure 3:
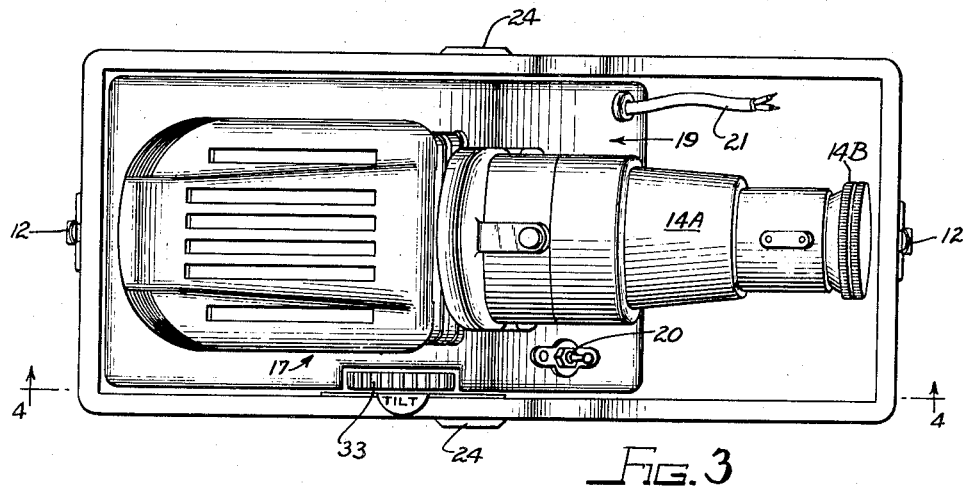
Fig. 3 is a top plan view of the device of Fig. 2.

In the construction, as depicted particularly in Figs. 3 and 4, it will be observed that the configuration of the base tray supplements the apron 19 in completing the base structure for the projector in all ranges of movement of the latter in the tray, while at the same time affording easy access to the switch 20 and for necessary handling of the removable lens barrel 14A and the longitudinally adjustable lens mount 14B.

Thus, in addition to giving a pleasing configuration to the base portion of the projector and facilitating certain manipulations of the projector, the improved base structure eliminates the necessity for a considerable amount of metal which would otherwise be required to supplement the apron 19 in completing a base structure for the projector to house the various mechanisms, such as the motor 22 and other instrumentalities.

The rotilt adjustment, as referred to herein, is defined as a rotatively movable adjustor arranged and constructed eccentrically of the pivotal axis of the projector and operable by turning to engage an eccentric member, such as a follower pin, to tilt the projector, and further arranged and constructed as hereinafter specified to permit rocking movement of the projector by appropriate force applied manually thereto otherwise than by turning the rotatable member, as by simply pressing upon the lens barrel 14A.

The construction making possible the foregoing tilting operation is detailed in Fig. 6, which shows a mounting plate 30 yieldably secured along a lower edge region, as by screws 31, for a slight displacement later described, said plate having staked therein a pivot pin 32 rotatably mounting a knurled adjusting wheel 33, having formed in an axial end wall 34 thereof a spiral track 35 evolving concentrically of the pin center 32, and having rotund ridge formations as at 35X, that is to say, the apex portions of the spiral ribbing defining said groove are formed with a radius so as to present a rounded gliding surface engageable by the rounded head portion 36X of a follower pin 36 secured to a bracket as at 38 on the flange portion 16 of the projector housing.

From Figs. 3 and 4 it will be apparent that the adjusting wheel 33 and particularly the pivot pin 32, thereof, is situated eccentrically of the pivotal axis at 24 for the projector unit; and, likewise, the follower pin portion 36X is also eccentrically situated of the axis through the trunnion or pivot at 24, from which it follows that a rocking force, applied to the lens barrel 14A, for instance downwardly in Fig. 4, would tend to displace the follower pin in an approximately radial sense to the pivotal axis 32 of the adjusting wheel, and cause the rounded head portion 36X of the follower to ride over the round apex of the spiral track into an adjoining section of the latter, their being sufficient yieldability in the mounting plate 30 for the spiral tilting wheel to permit such jumping of the follower pin from one groove portion to another.

As a result of the foregoing rotilt structure, the projector may be carefully tilted to a precise position by turning of the wheel 33 so that the projector is in the elevated off-normal position shown in full lines in Figs. 2 and 4, for example. However, when it is desired to return the projector to its carrying case quickly, it is unnecessary to manipulate the wheel 33 since a pressure applied to the lens barrel will quickly cause the follower to jump the spiral grooving sufficiently to restore the projector to the dotted-line position portrayed in Fig. 4.

The follower bracket 37 (Fig. 6) is also intended to be constructed of spring metal so as to yield and permit an approximately axial displacement of finger 36 from the spiral track. Such yieldability may be exclusive of or in addition to any yieldability on the part of the wheel 33 with plate 30. In some commercial models the wheel 33 and plate 30 are constructed as lightweight stampings, and the plate alone, being of thin metal, affords adequate yieldability, while in other models the wheel is cast and plate 30 is of heavier gauge, in which case arm 37 is of spring metal to yield, as aforesaid.

In some commercial models, the blower motor assembly 22—26 is omitted, in which case the spring 27 may be omitted, since the pivotal axis through bolts 24 is at the center of balance of the projector and no particular load is placed on the eccentric rotilt means, such as occurs when the blower motor is included.

A further feature of the improved base structure, as depicted in Fig. 5, resides in the provision of tripodal feet including a rearwardly disposed, centrally located foot 40 and a pair of forwardly situated feet 41 and 42 on the bottom face 11C of the base, both of the latter being positioned close to the trunnion bolts 24 on opposite sides of a longitudinal center line through the base tray.

By reason of the foregoing foot arrangement, it will be apparent that the table-surface area necessary to accommodate the projector in use need be no greater than the total triangulation area included with the limits bounded by the feet 40, 41, and 42, it being important to observe that such an area is considerably less than that defined by the limiting margins of the bottom face 11C of the tray.

A further feature of adjustment resides in the provision of an elevating adjustment in conjunction with one of the forward feet 42 and attachment of the latter to a threaded stud 43 working in a threaded sleeve 44 secured in the bottom face 11C, such that rotation of the leg 42 will thread the latter into and out of the sleeve, for the purpose of elevating or lowering the base as a further centering adjustment of the image on the projection screen.

The improvements disclosed afforded a combination carrying case and adjustable base structure for a projector, making it necessary merely to remove the cover section 10 in order to expose the projector for immediate use. The rotilt adjustment means 33, etc., affords a relatively fine tilting adjustment or a coarse pressure adjustment for quickly rocking the projection to a desired position, and the elevating leg structure 41 and 42, in addition to minimizing the area of supporting surface required, affords a further image-centering adjustment.

The several aspects and advantages of the improvements disclosed in the illustrative embodiment may be realized in modified forms, all of which are intended to be included within the fair scope of the invention as defined in the following claims.

I claim:

1. The combination with a projector of the class described of mounting means including a base in the form of a tray having a bottom with adjoining opposite side walls and trunnion means engaged respectively in a pair of said opposite side walls, and pivot means on the projector engaged in said trunnion means and mounting said projector for rocking motion, said tray defining a receptacle for lower portions of said projector and a stable rocking support for the latter, together with a rotilt adjustment including a rotatable member mounted on a wall portion of said tray eccentrically of said trunnion means, a spiral ridge defining a spiral track on said rotatable member, and follower means on said projector and situated eccentrically of its rocking axis through said trunnion means and working in said track to tilt the projector responsive to rotative movement of the rotatable member, said follower means and said rotatable member being relatively yieldable in the direction of said axis such that a tilting force applied to the projector will produce tilting movement independently of any rotation of the rotatable member.

2. Improvements in accordance with claim 1 further characterized in that said spiral track has a rounded top surface and is formed in an axial end wall in the rotatable member, and the latter is mounted to yield in an axial direction away from said follower whereby the latter may be forcibly displaced over said rounded top surface from one section of said track into an adjoining section thereof, responsive to a tilting force applied to the projector itself as aforesaid for adjusting the position of the latter without turning of said rotatable member as set forth.

3. In a projector, mounting means comprising a tray having a bottom and four adjoining side walls, three adjoining sidewall portions at one end of the tray being of lower elevation than the corresponding wall portions at the opposite end thereof from a point approximately midway between said ends, and pivot means in opposite walls of the tray and close to the juncture point of the lower and higher portions of said opposite walls pivotally mounting a projector with bottom portions of the projector received within the tray and concealed by the three adjoining wall portions of higher elevation.

4. The construction defined in claim 3, in which said projector has a bottom shield confronting the lower-walled regions of the tray, said shield and the three walls of higher elevation providing a concealing bottom encasement and base for the projector.

5. In combination with a projector of the type having a lamp housing, a lens barrel, and mechanism underlying the bottom portions of said housing, at least, a base structure comprising an elongated tray having a bottom and four adjoining side walls, pivots in opposite side walls of the tray engaging said projector at its bottom at approximately the juncture point between said housing and barrel, spring means connected to said projector to urge the same pivotally to counterbalance the weight of said housing, tilt adjustment means including a rotatable member on a side wall of the tray eccentrically of one of said pivots, an eccentric member on said projector coacting with said rotatable member to tilt the projector, said projector having a slide carrier slot between the lamp housing and barrel and situated above and close to said pivots to minimize tilting moment which might result from manipulation of slides.

6. The construction set forth in claim 5 and further characterized in that three adjoining walls of said tray are cut away from a point near said pivots to an opposite end of the tray, to afford a shallow section underlying said barrel, and said projector has a bottom shield confronting said shallow section and having control means thereon accessible for manipulation from said shallow section.

7. In a projector, mounting means comprising an elongated base tray of rectangular shape, a projector pivotally mounted between opposite side walls of the tray at a point about midway between the longitudinal ends thereof and in position such that three adjoining wall portions of the tray shield the bottom portion of the projector from view, three adjoining tray walls at the end of the tray opposite from said first-mentioned wall portions being cut away and lower than the latter portions from a point adjoining said midway point and affording an access space, said projector having a downwardly projecting apron in said access space and shielding the bottom portion of the projector from view cooperably with said first-mentioned three-wall portions, and a cover for said tray having three cut-away wall portions complementary to the cut-away wall portions of the tray and interfitting therewith in assembled relation.

8. For a projector, a combination carrying case and base structure comprising a shallow base tray, a removable cover for said tray, the latter having a bottom including at least one pair of opposite, upstanding sidewalls, a projector pivotally mounted on axially-aligned pivot means respectively carried in a pair of said opposite sidewalls, to rock about a horizontal axis with said tray as a base, said pair of sidewalls and the pivot means therein being of a height relative to the tray bottom to permit substantial pivotal movement of the projector up and down relative to said bottom, and cooperating fastening means on said cover and base tray member for removably securing said members together to define an enclosing case.

9. A combination projector case and base structure comprising a relatively shallow base box, a projector pivotally supported in said base box on pivot means engaging in opposite sides thereof with substantial portions of said projector, including lens means thereof, disposed above the top margins of said sides, and the projector adapted to tilt up and down relative to the bottom of the base box, a box-like cover member for said base box member and complementary to the latter to completely encase the projector, means for removably securing said members together, and a combination tilting and adjusting cam for the projector and including in cooperation with said pivot means, a rotatable member having a spiral cam track therein, and a track follower on the projector eccentric of its pivotal axis and engaged in said track, the follower and rotatable member being relatively yieldable such that a forced tilting effort on the projector causes the follower to jump from one track portion into another without rotation of the rotatable member, while rotation of the latter causes the follower to be displaced to tilt the projector.

10. A portable picture projector comprising a base tray having a bottom and four adjoining upstanding walls, a projector having pivotal support in said tray by means of pivotal connection between a lower portion of the projector and each of two opposite ones of said walls, three of said walls being high enough to shield the bottom portion of the projector from view in the tray, there being a fourth wall portion of the tray opposite the front bottom region of the projector which is lower than the remaining walls, said projector having an apron at its said front portion projecting into the tray in a direction toward said lower fourth wall, said apron having a control instrumentality for the projector mounted thereon and rendered easily accessible for manipulation in the various rocking positions of the projector by reason of the lower level of said fourth wall; and a complementary cover fitting over said projector and onto said tray to define a carrying case for the projector, together with means on the tray and cover for releasably securing the same together.

11. A tilt control for projectors and like devices adapted to rock about a predetermined tilting axis, said control including a rotatable handle and means mounting the same adjacent said device, means defining a spiral groove track rotatable concentrically with said handle, said tracking having rounded ridges; and means including a follower pin having connection with said device and projecting in parallelism with said rocking axis into said track at a point eccentric of the axis of the track and handle so as to be translated by turning of the handle and track to tilt said device, said follower pin and track means being relatively yieldable in an axial sense such that a predetermined tilting force applied to said device will cause said pin to glide over said ridges from one of said grooves to another whereby the device may be quickly tilted directly without resorting to turning of said handle.

12. In a projector, a base for the projector and means mounting the latter on the base to rock about a horizontal axis extending transversely of the base at a point located between two opposite margins of said base; a pair of feet on said base near one of said margins and spaced apart in the direction of said axis, and a third foot which is vertically adjustable and located on said base away from said pair of feet and on the opposite side of said axis from said pair, said feet being situated relatively in a triangular array so that said rocking axis is located between said pair of feet and said third adjustable foot.

References Cited in the file of this patent

UNITED STATES PATENTS

| | | |
|---|---|---|
| 1,172,945 | Cook | Feb. 22, 1916 |
| 1,738,762 | De Vault | Dec. 10, 1929 |
| 1,925,149 | McCandless | Sept. 5, 1933 |
| 2,070,226 | Erwood | Feb. 9, 1937 |
| 2,169,010 | Teague et al. | Aug. 8, 1939 |
| 2,221,920 | Kurtz et al. | Nov. 19, 1940 |
| 2,231,743 | Young et al. | Feb. 11, 1941 |
| 2,301,415 | Koehl | Nov. 10, 1942 |
| 2,366,554 | Peck et al. | Jan. 2, 1945 |
| 2,391,879 | Chambers | Jan. 1, 1946 |
| 2,496,647 | Woodbury | Feb. 7, 1950 |
| 2,506,169 | Perillo | May 2, 1950 |
| 2,578,106 | Taylor | Dec. 11, 1951 |